(12) United States Patent
de Graauw et al.

(10) Patent No.: US 7,678,237 B2
(45) Date of Patent: Mar. 16, 2010

(54) HEAT INTEGRATED DISTILLATION COLUMN

(75) Inventors: Johannes de Graauw, Zoetermeer (NL); Maarten Jan Steenbakker, Rotterdam (NL); Arie de Rijke, Maasdijk (NL); Zarko Olujic, Pijnacker (NL); Pieter Johannes Jansens, Bergschenhoek (NL)

(73) Assignee: Technische Universiteit Delft, Delft (NL)

( * ) Notice: Subject to any disclaimer, the term of this patent is extended or adjusted under 35 U.S.C. 154(b) by 1247 days.

(21) Appl. No.: 10/502,450

(22) PCT Filed: Jan. 22, 2003

(86) PCT No.: PCT/NL03/00046

§ 371 (c)(1),
(2), (4) Date: Jan. 13, 2005

(87) PCT Pub. No.: WO03/061802

PCT Pub. Date: Jul. 31, 2003

(65) Prior Publication Data

US 2005/0121303 A1    Jun. 9, 2005

(30) Foreign Application Priority Data

Jan. 25, 2002    (EP) .................... 02075326

(51) Int. Cl.
*B01D 3/00*    (2006.01)
*B01D 3/14*    (2006.01)

(52) U.S. Cl. ............... 203/25; 165/146; 202/153; 202/158; 203/100; 261/114.5; 261/128

(58) Field of Classification Search ......... 202/153, 202/158, 187, 237; 203/25, 100; 165/143–147, 165/168, 177; 261/114.5, 128, 148–150
See application file for complete search history.

(56) References Cited

U.S. PATENT DOCUMENTS

| 4,025,398 | A | 5/1977 | Haselden |
| 4,234,391 | A | 11/1980 | Seader |
| 4,681,661 | A | 7/1987 | Govind |
| 5,592,832 | A * | 1/1997 | Herron et al. ............ 62/646 |
| 5,783,047 | A | 7/1998 | Aso et al. |
| 7,111,673 | B2 * | 9/2006 | Hugill .................... 165/166 |

* cited by examiner

*Primary Examiner*—Virginia Manoharan
(74) *Attorney, Agent, or Firm*—Fitch, Even, Tabin & Flannery

(57) ABSTRACT

A heat integrated distillation column including a cylindrical shell having an upper and a lower end and at least one first inner volume and at least one second inner volume in the shell, and being in heat exchanging contact with each other through a wall separating the volumes. The heat integrated distillation column having the capacity to exchange heat through the wall from the first volume into the second volume, whereby the inside of the heat exchanging means is in open connection with the first volume.

19 Claims, 10 Drawing Sheets

HEAT INTEGRATED DISTILLATION COLUMN

This application is the U.S. National phase filing of PCT/NL03/00046, filed Jan. 22, 2003, the complete disclosure of which is incorporated herein by reference, and which was published under PCT Article 21(2) in English.

The invention relates to a heat integrated distillation column having separate volumes inside the column, which is especially suitable for distillation operations in the process industry. More particularly, the invention relates to such a column, wherein the volumes can be operated at different temperatures with improved heat exchange, thereby providing energy advantages in the operation.

It is well recognized that heat integration in distillation columns is an important means for providing improvements in energy efficiency in the operation of distillation. However, the application of this technology has been impeded by factors of cost of construction and the difficulty of providing adequate heat exchange, especially without complicated construction of the column(s).

In U.S. Pat. No. 4,681,661 a heat integrated distillation column has been described, where the distillation column comprises a central column, and an outer, annular column around the central column. Thereby different regions are provided in the column, which regions can be operated at different pressures. Both regions are provided with conventional trays and downcomers.

In U.S. Pat. No. 5,783,047 a heat integrated distillation column has been described, which column comprises an outer shell and inside one or more tubes. Thereby different regions are provided in the column and the regions can be operated at different pressures. However, in order to provided sufficient heat exchange area between the two regions in industrial large scale operations, several tubes of relatively small diameter have to be placed in the outer shell. Due to the relatively small diameter have to be placed in the outer shell. Due to the relatively small diameter of the tubes, the use of distillation internals inside the tubes is limited to irregular packing rings or structured packing. The use of trays requires a complicated construction.

In U.S. Pat. No. 4,234,391 a continuous distillation apparatus and method has been described, wherein a column has been divided into two separate semi cylindrical sections by a dividing wall, one section functioning as stripping section and one as rectification section. It is an object of the present invention to provide a heat integrated distillation column, consisting of two separated volumes along the length of the column, wherein sufficient heat transfer is provided between the volumes. It is also an object of the invention to provide for a heat integrated distillation column of this type, wherein trays can be used.

This object and other objects are provided for by the column of the invention. This column is a heat integrated distillation column comprising a cylindrical shell having an upper and a lower end and at least one first inner volume and at least one second inner volume in the shell, the two volumes being in heat exchanging contact with each other through a wall separating the volumes. In one illustrative example, the improvement comprising providing means having heat exchanging capacity extending through the wall from the first volume into the second volume, whereby the inside of the heat exchanging means is in open connection with the first volume. Of course the heat exchange means have no connection for mass transfer to the other (second) volume.

The important aspect of the column of the present invention resides in the presence of means for providing heat exchange, which means extend into the other volume, thereby providing for the possibility of heat transfer from the one volume to the other volume, resulting in partial condensation of vapour in the hotter (usually high pressure) section and (partial) evaporation of liquid in the cooler (usually low pressure) section.

The heat integrated distillation column of the invention preferably has an enriching section and a stripping section, one of the volumes being the enriching section and the other being the stripping section. When the terms 'enriching section' and 'stripping section' are used herein they are also to be considered referring to the separate volumes of the column.

The heat integrated distillation column of the invention has a construction in which the enriching (rectification) section (E) (portion above the feed stage) and the stripping section (S) (portion below the feed stage), an encountered in a conventional distillation column are separated from each other and disposed in parallel, and the operating pressure of the enriching section is made higher than that of the stripping section so that the operating temperature of the enriching section becomes higher than that of the stripping section. In this configuration, if there exists a heat transfer surface between them, heat transfer occurs from the enriching section to the stripping section. In the heat integrated distillation column of the invention the heat transfer occurs from the enriching section to the stripping section.

The invention can be seen in two preferred embodiments. In the first embodiment the heat exchange means are located in the cooler section and vapour is introduced into the heat exchange means from the hotter section and condenses in the heat exchange means, thereby giving off heat to the cooler section. The condensed vapour (liquid) is returned to the hotter section. On the outside of said heat exchange means, liquid is evaporated.

In the second embodiment the heat exchange means are located in the hotter section and liquid from the cooler section is passed into the heat exchange means. Said liquid is (partially) evaporated inside the heat exchange means and vapour (partially) condenses on the outside of the said heat exchange means. The vapour generated in the heat exchange means is returned to the cooler section. In general it is preferred to have liquid film flow in both embodiments.

In the heat integrated distillation column of the invention, in both of the volumes, vapour which enters from the lower end and goes out of the upper end comes in contact with liquid which enters from the upper end and flows to the lower end, on the surface of the packing or on the trays. At this time, the mass transfer occurs, and hence the distillation operation is performed. In the heat integrated distillation column of the invention, two distillation sections, i.e., a higher-pressure section and a lower-pressure section are disposed in one column.

In contrast to the conventional distillation column in which the heat input is provided by a reboiler, according to the heat integrated distillation column of the invention, the heat input is mainly provided in the whole of the striping section, with the result that the heat load on the reboiler can be minimized. In the conventional distillation column, the heat removal is performed by a condenser disposed at the top of the column. In contrast, according to the heat integrated distillation column of the invention, the heat removal is performed in the whole of the enriching section with the result that the condenser duty can be minimized. Accordingly, it is possible to save a considerable amount of energy, compared with conventional distillation columns.

In a heat integrated distillation column, vapour is condensed in the enriching section, and hence the flow rate of the vapour is decreased toward the upper portion and liquid is vaporized in the stripping section, so that the flow rate of the vapour is increased toward the upper portion. Therefore, in order to ensure that the ratio of the volume flow rate of the ascending vapour and the cross-sectional area of the specific volume is kept within the operating range of column internals irrespective of the height of the column, the volume cross-sectional area should be decreased when moving from the bottom to the top of the enriching section, and increased when moving from the bottom to the top of the stripping section. This aspect of a preferred embodiment of the invention has been shown in the figures, which will be discussed below.

The column of the invention may be constructed in various ways, provided the two volumes are always adjacent to each other, divided by a separating wall. In practice this means that two possibilities are preferred. The first possibility is a column, having a concentric inner column. The other possibility is a column provided with a dividing wall that reaches from one side of the column to the other side.

The column of invention contains means for improving vapour/liquid contact, which means can for example be trays, which is preferred, but also random or structured packings. It is not necessary to have the same system of said means for improving vapour/liquid contact in both volumes.

As indicated above, preference is given to the use of trays with downcomers, as these provide an easy and uncomplicated way of providing vapour/liquid contact. In this embodiment the means for heat exchange, preferably vertical heat transfer panels, are provided in the downcomer, and the liquid that flows down is distributed over the surface of the panels by means of liquid distribution systems.

The means having heat exchanging capacity can have the form of plates or a tubular construction. The surface of the plates or tubes can be smooth or textured. In general it is possible to use coils, flat plates, dimple plates, finned plates or finned tubes, corrugated plates or other plates that enhance heat transfer.

In general it is preferred that there are vapour-liquid disengagement means present in, in between, around or above the heat exchange means, to improve separation of vapour from liquid. Suitable means are fins, vanes, corrugated structured packing sheet, dumped packing and the like.

The heat exchange means extend through the wall from the first volume into second volume, whereby the inside of the heat exchanging means is in open connection with the first volume.

In a first embodiment of the invention, the heat exchange means are in open connection with the section having the highest temperature (the enriching section) and vapour enters the heat exchange means from the enriching section and condenses inside. The heat is transferred through the walls into the second volume (the stripping section), where liquid evaporates on the outside surface of the heat exchange means. The condensate flows back into the enriching section.

In the second embodiment, the heat exchange means are in open connection with the section having the lowest temperature (usually the stripping section) and liquid enters the heat exchange means from said volume and is partially vapourised on the inner surface of the heat exchange means by heat transferred through the wall of the heat exchange means from the section having the highest temperature (the enriching section). In this section vapour condenses on the outside surface of the heat exchange means. The remaining liquid flows back into the stripping section, as well as the vapour.

The present invention is especially suitable for use in energy intensive distillation operations. Examples thereof are liquid air distillation and the various separations in the petrochemical industry, such as ethane/ethylene separation, propane/propylene separation, butane/isobutene separation, air separation, distillation to break azeotropes and the like.

An important aspect in the invention is the difference in operating pressure between the two volumes. In order to obtain such difference means have to be present to increase the pressure of the vapour stream going from one volume to the other volume (such as a blower or a compressor). The pressure in the enriching (or rectification) section will be higher than the pressure in the striping section. In general the ratio of the pressures will not be much higher than that required theoretically to obtain sufficient amount of vaporization of the liquid in the stripping section. In general this ratio will not exceed 2.

The invention will now be elucidated on the basis of a number of figures, wherein preferred embodiments of the invention will be described. These figures are not intended as limiting the scope of the invention.

DETAILED DESCRIPTION OF FIGURES

Generally speaking, pursuant to these various embodiments, a heat integrated distillation column 5 is provided for use in the distillation process. The heat integrated distillation columns have a first and a second inner volume within the column such that the two volumes operate at different temperatures while being in heat exchanging contact with one another through a dividing wall.

Figure 1:
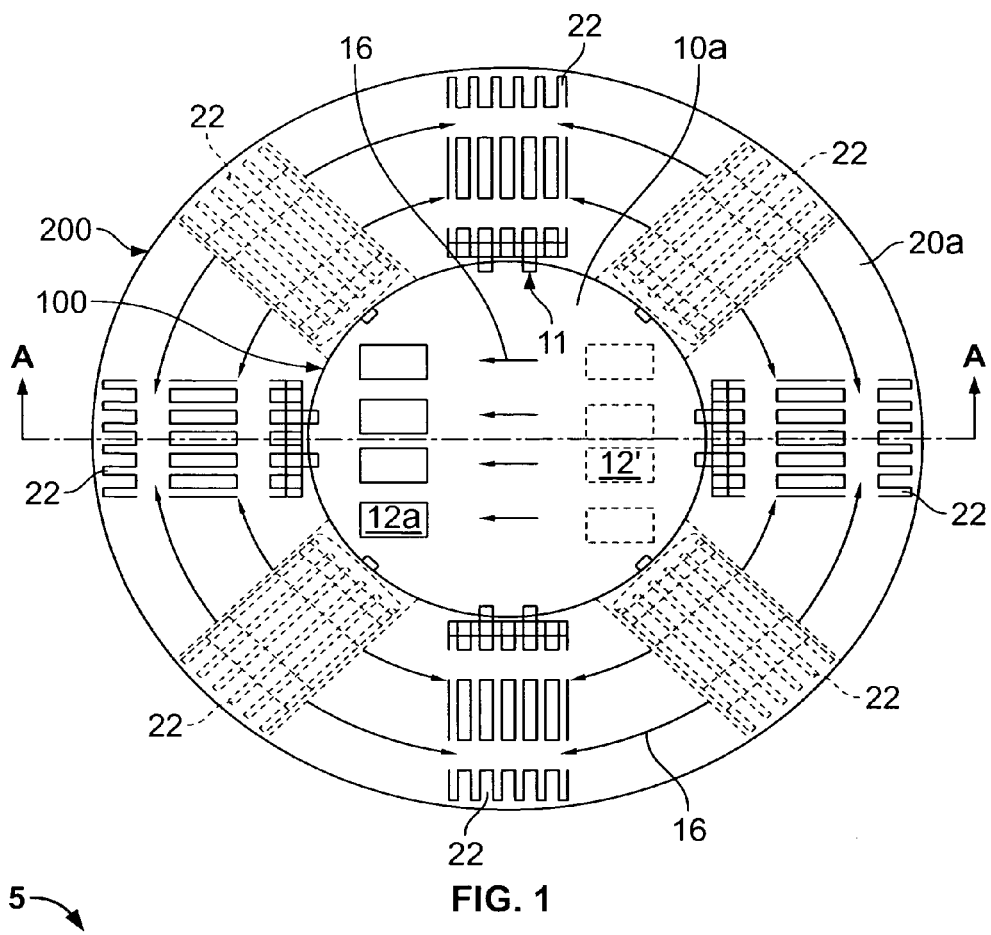
FIG. 1 shows a top view of a tray in a concentric column according to an embodiment of the invention, which column has been fitted with trays and downcomers.
Figure 2:
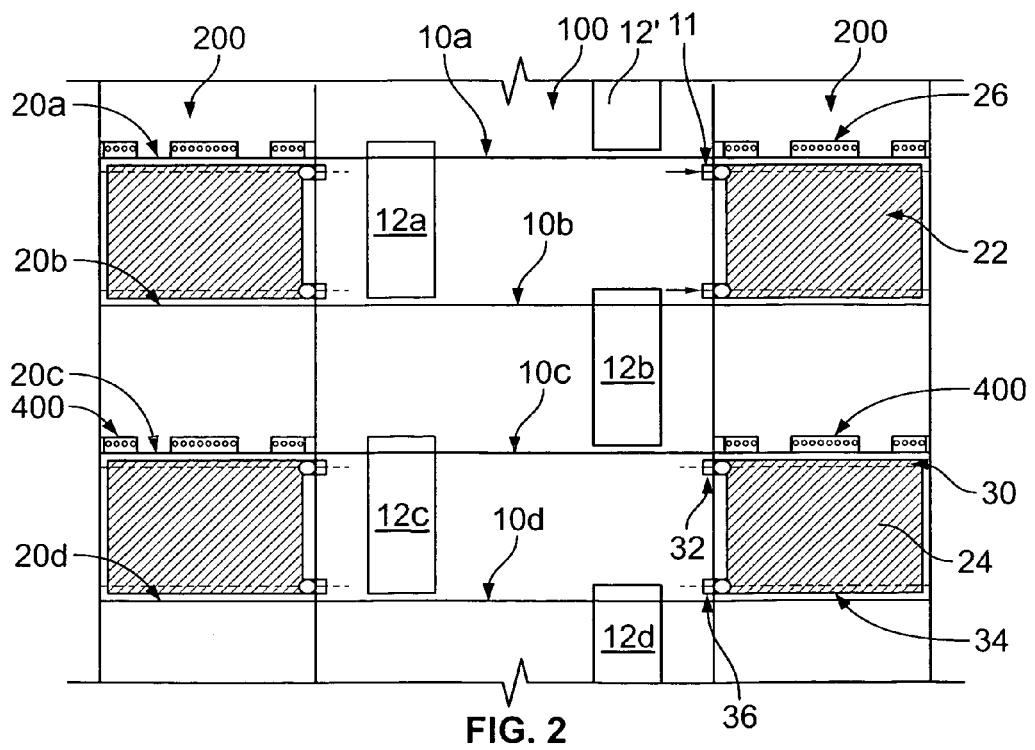
FIG. 2 shows a vertical cross-section of the column depicted in FIG. 1, along the line A-A.

These and other benefits may become clearer upon making a thorough review and study of the drawings along with the following detailed description. Referring now to the drawings, and in particular to FIG. 1, which shows a top view of a tray 10*a*, 20*a*. In addition, FIG. 2 shows a vertical cross section of a part of the column 5 according to one embodiment of the invention, wherein the heat exchange means 11 are in open connection with the volume of the highest temperature. The cross section shows four (4) trays 10*a*, 10*b*, 10*c*, 10*d* in the inner column 100 and 4 trays 20*a*, 20*b*, 20*c*, 20*d* in the annular outer column 200. The top view of FIG. 1 illustrates tray 10a, 20a and FIG. 2 shows the cross section along line A-A as indicated in FIG. 1. The trays can be either sieve trays or any other type used in industrial distillation such as valve trays, bubble cap trays, or tunnel trays. The distillation column 5 also includes downcomers 12. The dashed lines on the top view of FIG. 1 show the downcomers 12' positioned above the tray, whereas the solid lines illustrate downcomers 12a that are positioned through tray 10a.

Tray 'a' of the inner column 100 is of ordinary cross flow design and provided with rectangular downcomer pipes. The arrows 16 indicate the direction of the liquid flowing over the tray. The liquid exiting the downcomers 12' from the tray above enters tray 10a on the right-hand side, flows over the tray and is then collected in the downcomers 12a on the left-hand side.

Figure 5:
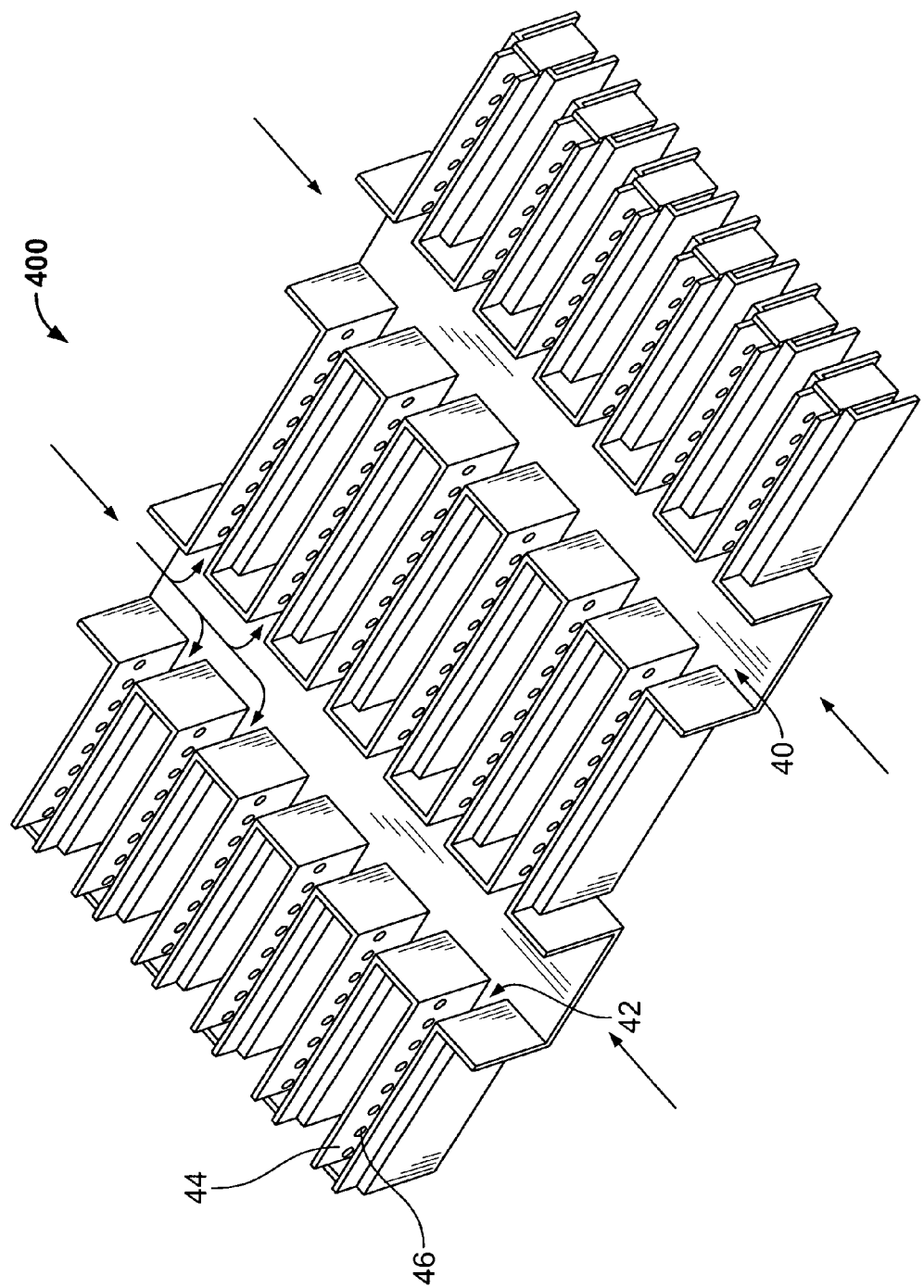
FIG. 5 shows a possible configuration of the liquid distribution system in a three-dimensional drawing.

In this example, the trays 20 in the outer annular column 200, illustrated in FIG. 2, are provided with four downcomers 22 in which the heat transfer panels 24 are mounted. The liquid exiting a downcomer 22 from the tray 20 located above that tray 20 splits up at the outlet into two equal portions each entering the active area of the tray 20. The arrows 16 indicate the direction of the liquid flow over the tray 20. At the end of the active area section, the liquid is collected in main troughs 40, which are positioned above the downcomers 22. As shown in FIG. 5, the troughs 40 are provided with side channels 42 that enable the distribution of the liquid over the heat transfer panels.

The cross section view of FIG. 2 along line A-A of FIG. 1 shows the position of the trays 20 and the heat transfer panels 24. The top 30 of the heat transfer panels 24 is connected via one or more tubes 32 to the vapour space of the inner column 100. At the bottom 34, the heat transfer panels 24 are provided with a tube 36 for drainage of the condensate to the tray 10 of the inner column 100.

Figure 3:
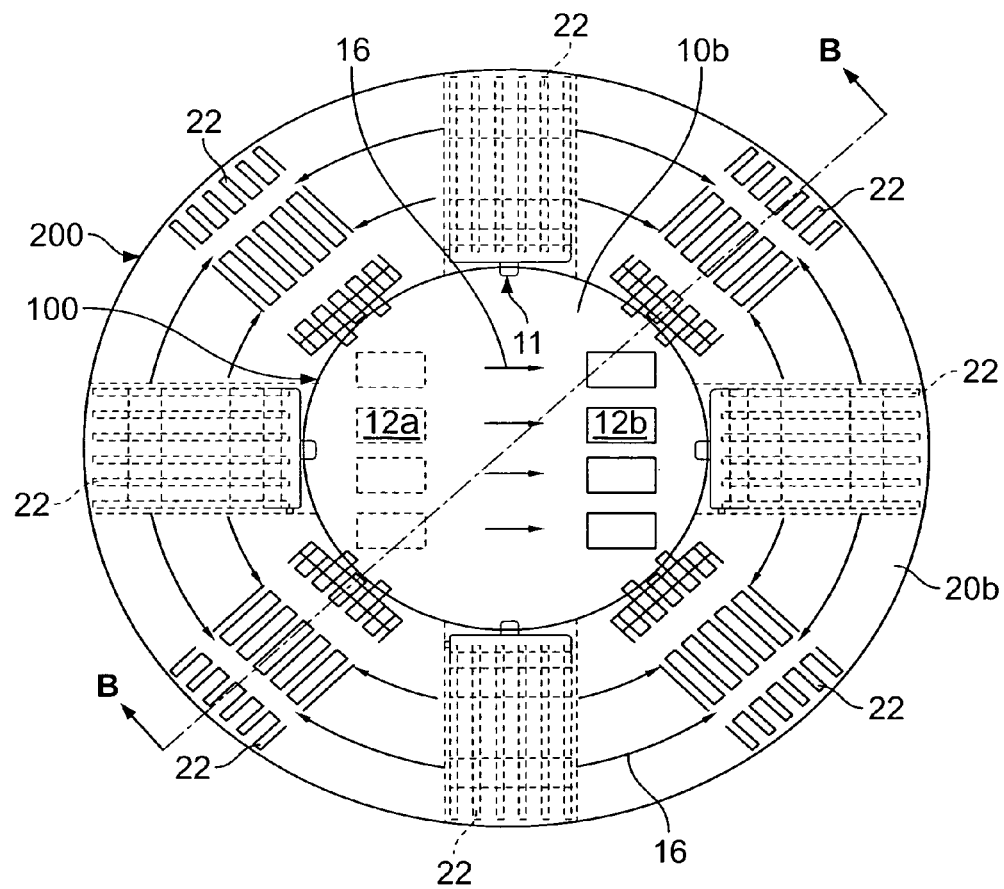
FIG. 3 shows a top view of a tray below that depicted in FIG. 1.
Figure 4:
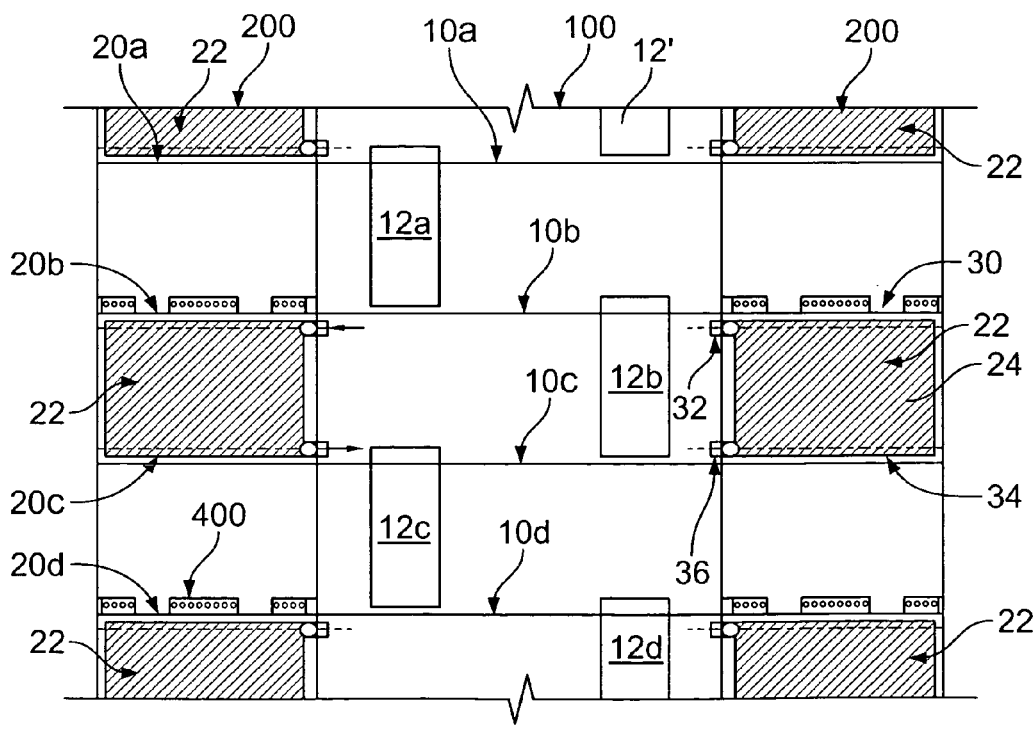
FIG. 4 shows a vertical cross-section along the line B-B in FIG. 3.

FIG. 3 shows a top view of tray 10b, 20b that is located directly below tray 10a, 20a; FIG. 4 illustrates the cross section of FIG. 3 along line B-B. The position of the downcomers 22 in the outer column 200 has been rotated over an angle of 45° with respect to the tray 20 above. In another embodiment, the trays 20 of the annular column 200 are provided with 2 downcomers such that the rotation angle will be 90°; and further in case of 6 downcomers, the rotation angle will be 30°.

Turning now to FIG. 5, a three-dimensional drawing illustrates a possible configuration of the liquid distribution system 400 placed above the heat transfer panels 24 in the downcomers 22 of the stripping section. The liquid flows via the main troughs 40 into the side channels 42. In the walls 94 of the side channels 42, holes 46 are provided to distribute the liquid over the heat transfer panels 24. At the outside of channel walls the holes are covered with splash plates to ensure a film flow of liquid over the heat transfer panels. For this reason, the splash plates extend over the top of the heat transfer panels. At the end of the channels weirs are provided to maintain a constant liquid level. Excessive liquid is discharged over these weirs.

Figure 6A:
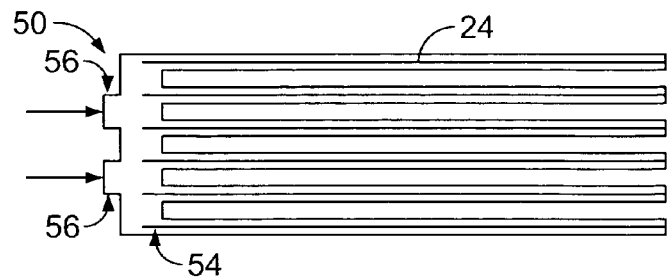
FIGS. 6A-6D show a possible assembly of heat transfer panels.
Figure 6B:
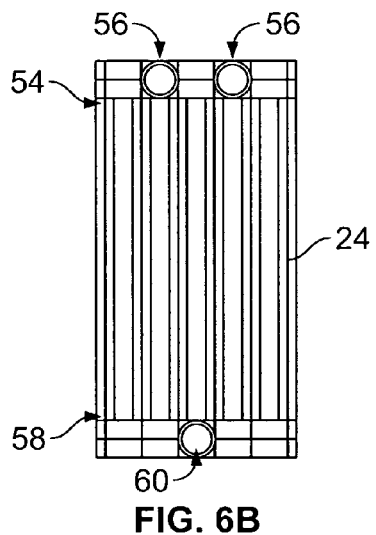
Figure 6C:
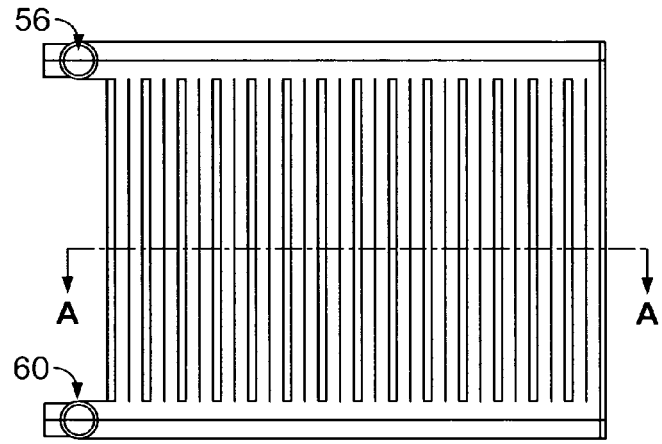
Figure 6D:
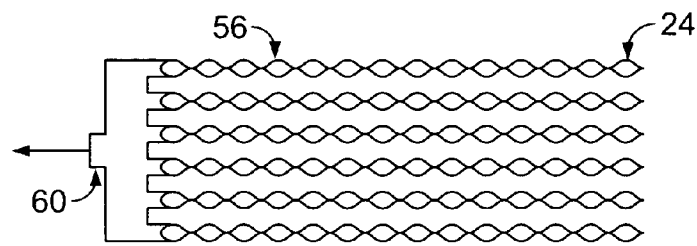

In FIGS. 6a-6d, an illustrative assembly of heat transfer panels 24 is shown. In this example, the assembly consists of six parallel panels 24. The panels 24 are preferably constructed of corrugated sheets oriented in the vertical direction. Other constructions like coils, flat plates, dimple plates, finned plates or other plates that enhance heat transfer are possible too. FIG. 6d shows that the corrugations in the panel 24 produce vertical channels 52. At the top, the channels 52 are connected to a vapour inlet channel 54. The six vapour inlet channels 54 are connected to a header with two vapour inlets 56. In a similar way, the condensate is drained into the inner column 100 at the bottom of the panels 24 via liquid outlet channels 58 connected to a liquid collection header 60.

Figure 7:
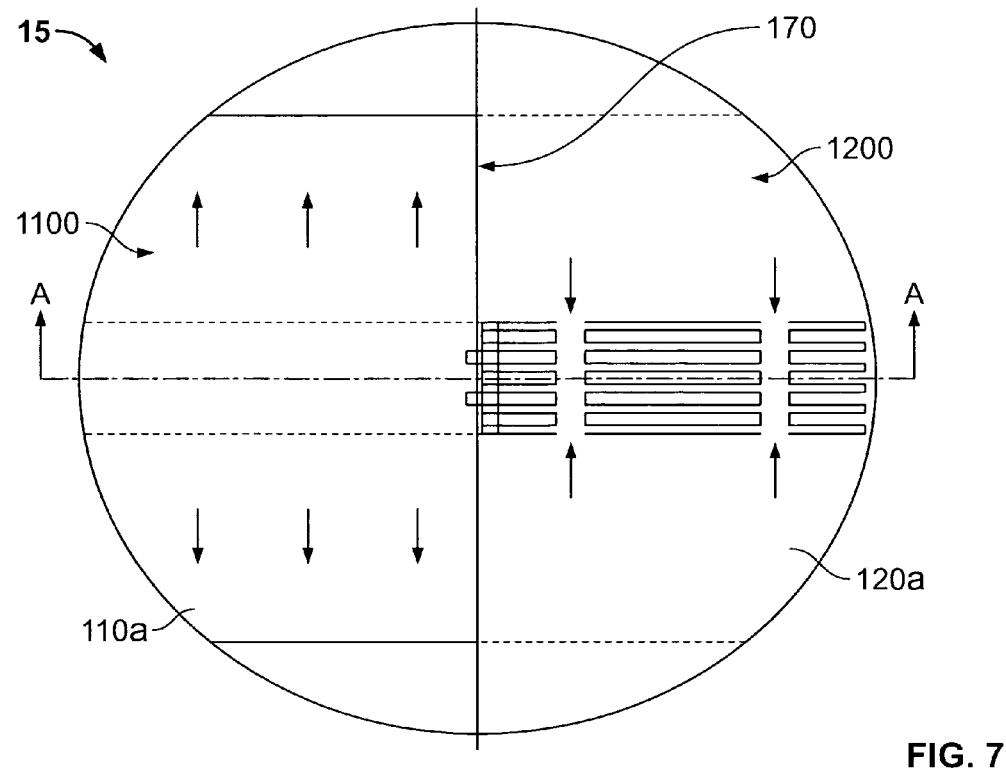
FIG. 7 shows a top view of a column of the invention based on a flat wall dividing the column into two volumes.
Figure 8:
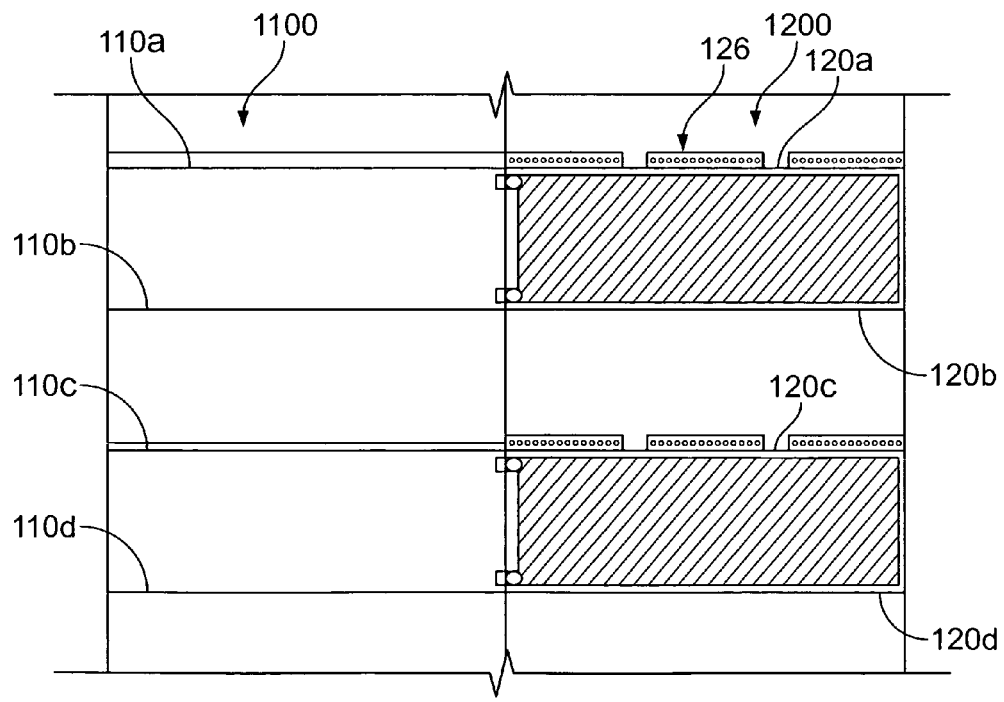
FIG. 8 shows a cross section of the divided wall column.

In another illustrative embodiment, distillation volume 15 is divided into two volumes 1100, 1200 by dividing wall 70. FIG. 7 shows a top view of a tray 110a, 120a of column 15 and FIG. 8 shows a cross section of a column 15 having a wall 70 dividing the two volumes 1100, 1200. In these figures the same features are shown as in the FIGS. 1-4.

Figure 9:
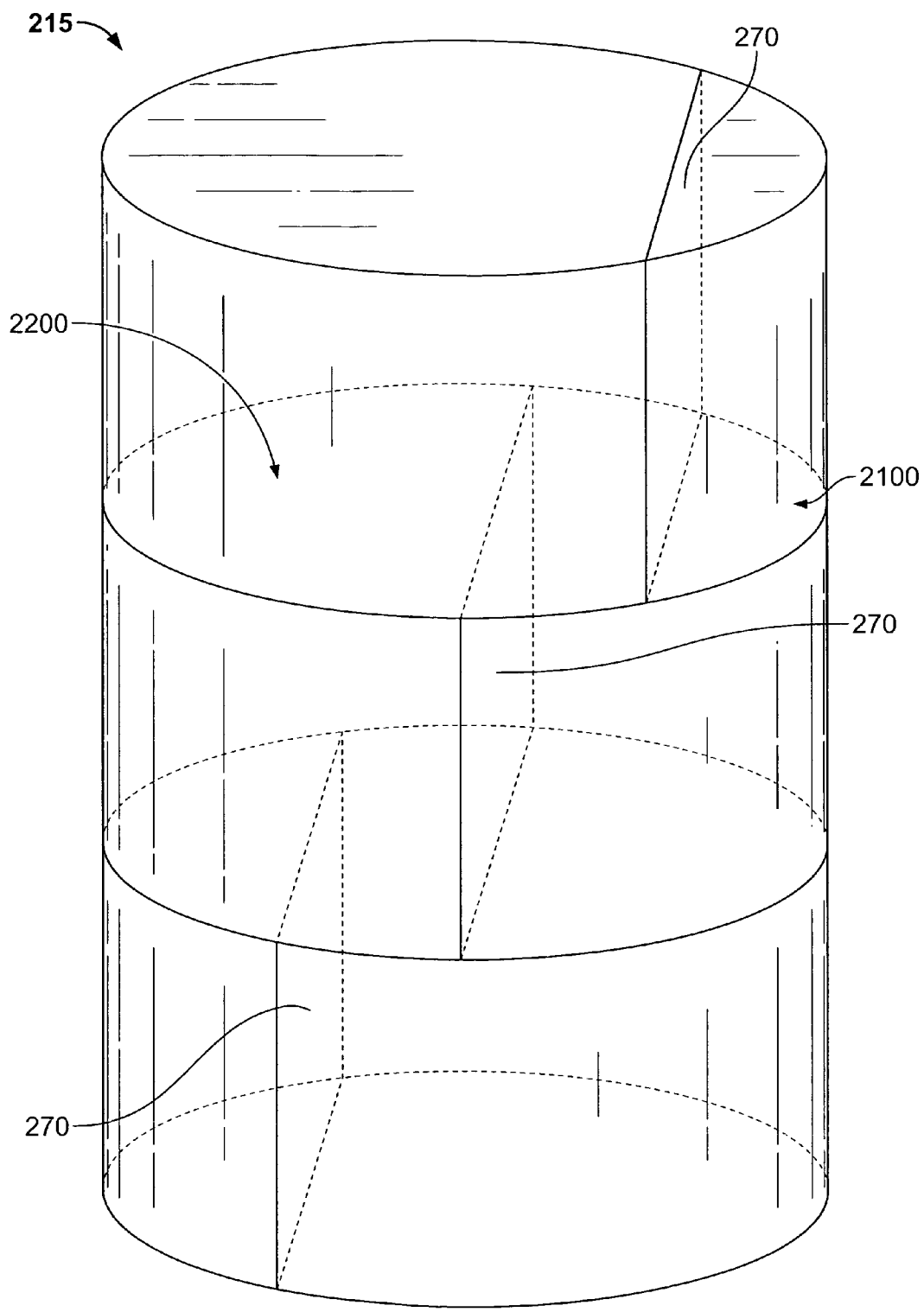
FIGS. 9 and 10 show the ratio of the cross sectional areas of stripping and enriching sections varying with the volume of vapour along the height of the column.
Figure 10:
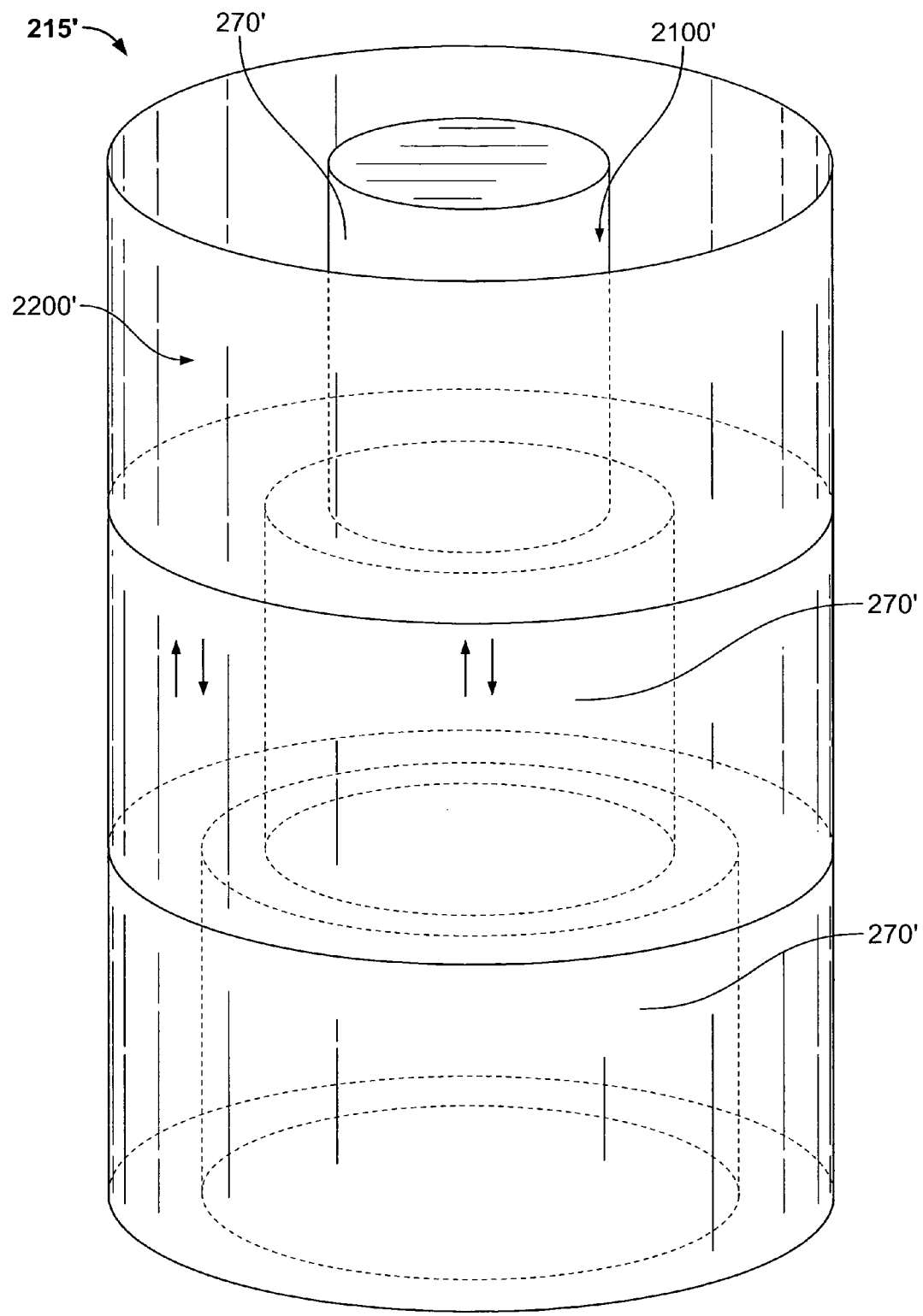

FIGS. 9-10 schematically illustrates that the ratio of the cross sectional areas of the stripping and enriching sections varies with the amount of vapour along the height of the column. This has been shown for two possible constructions; however, other constructions are contemplated. In FIG. 9, like the embodiment of FIGS. 7 and 8, a single cylindrical shell column is separated by a dividing wall 270 on each tray 210, 220 such that two semi cylindrical volumes 2100, 2200 are created. The cross sectional areas of both the enriching and stripping sections are changed stepwise. FIG. 10 shows the stepwise cross sectional area variation for a concentric column embodiment similar to the embodiment of FIGS. 1 and 2. Elements shown in FIG. 10 that correspond to elements of FIG. 9 are referenced with the same reference numeral, followed by a'. For example, the dividing wall in FIG. 10 is denoted 270'.

Figure 11:
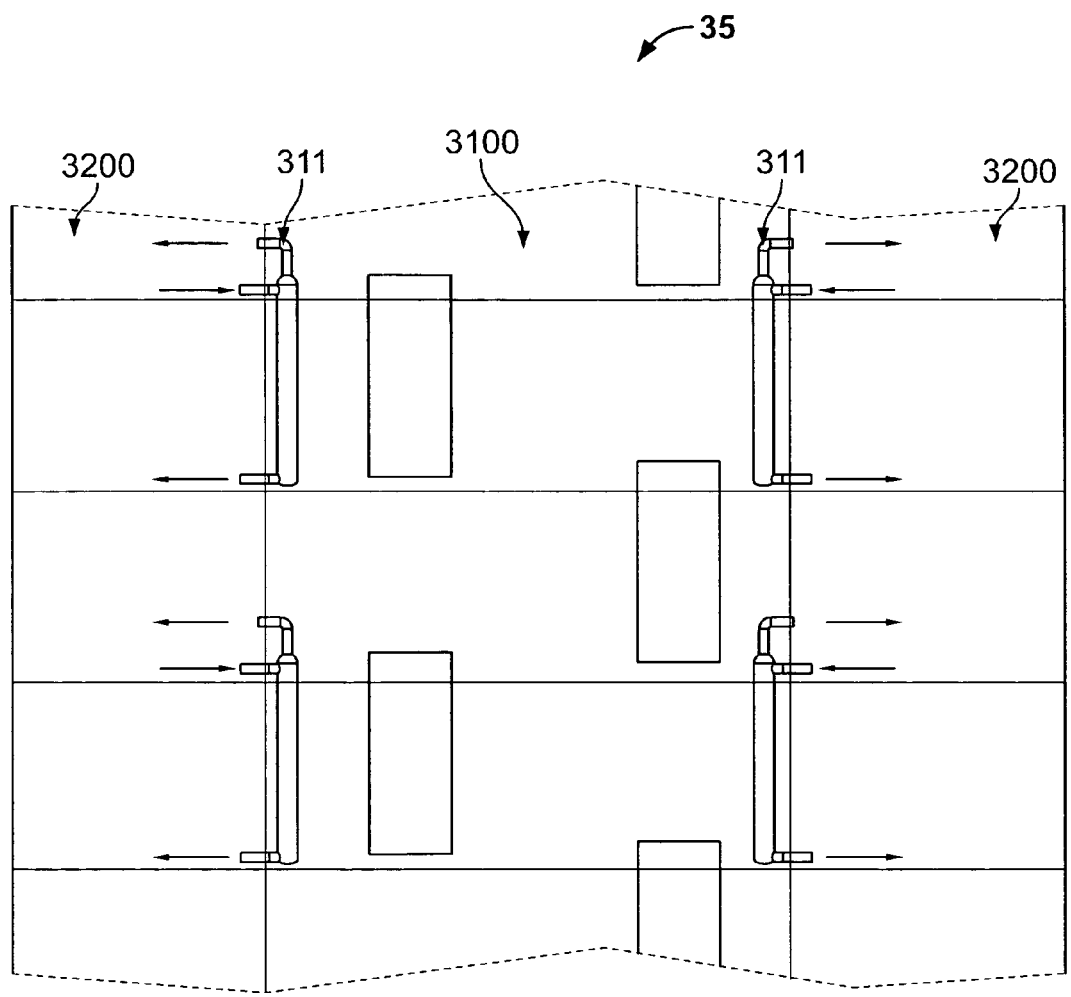
FIG. 11 shows a vertical cross-section of a column according to a further embodiment of the invention.
Figure 12:
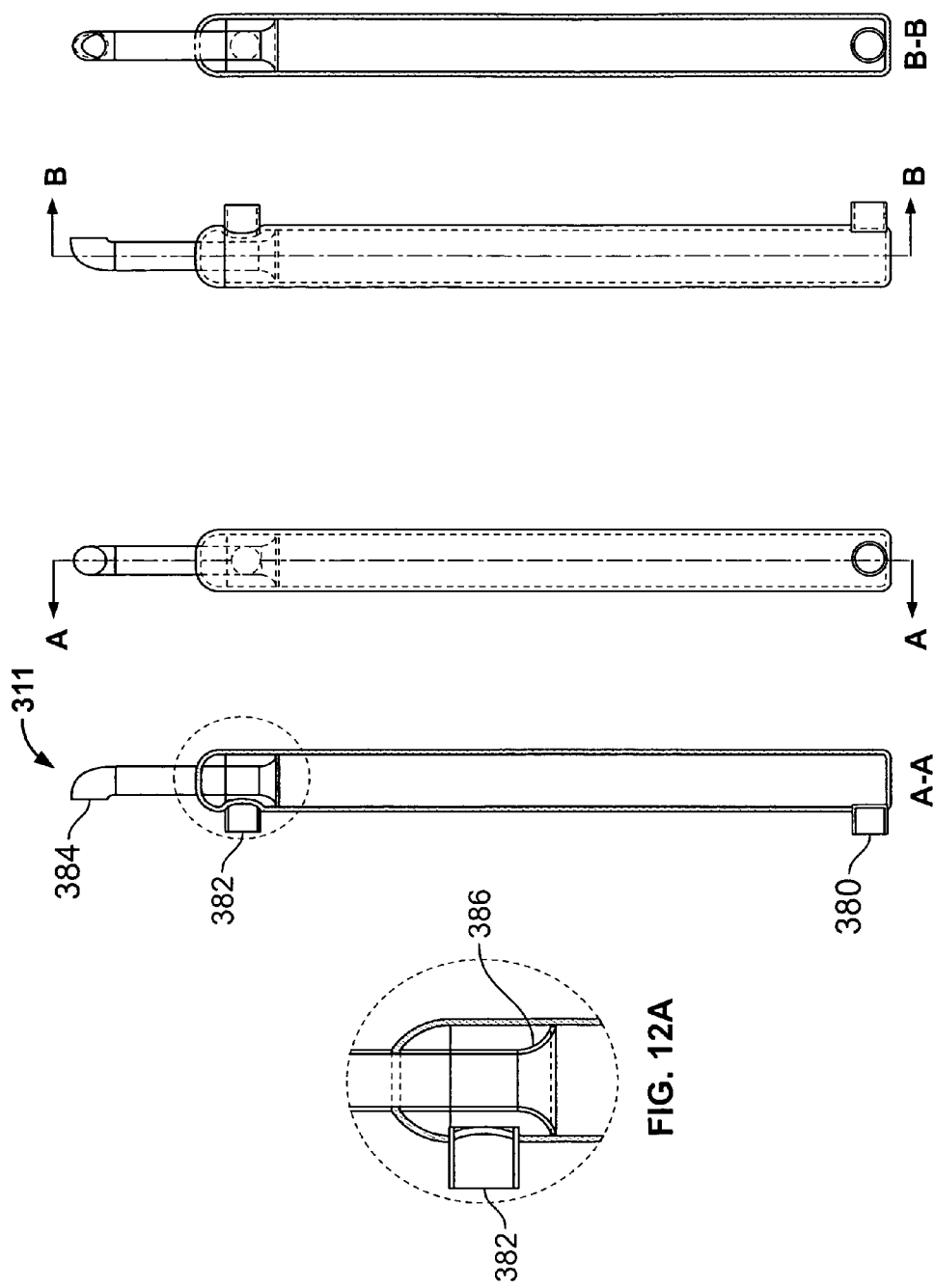
FIG. 12 shows various cross-sections of heat exchange means suitable for use in the embodiment of FIG. 11.
Figure 13:
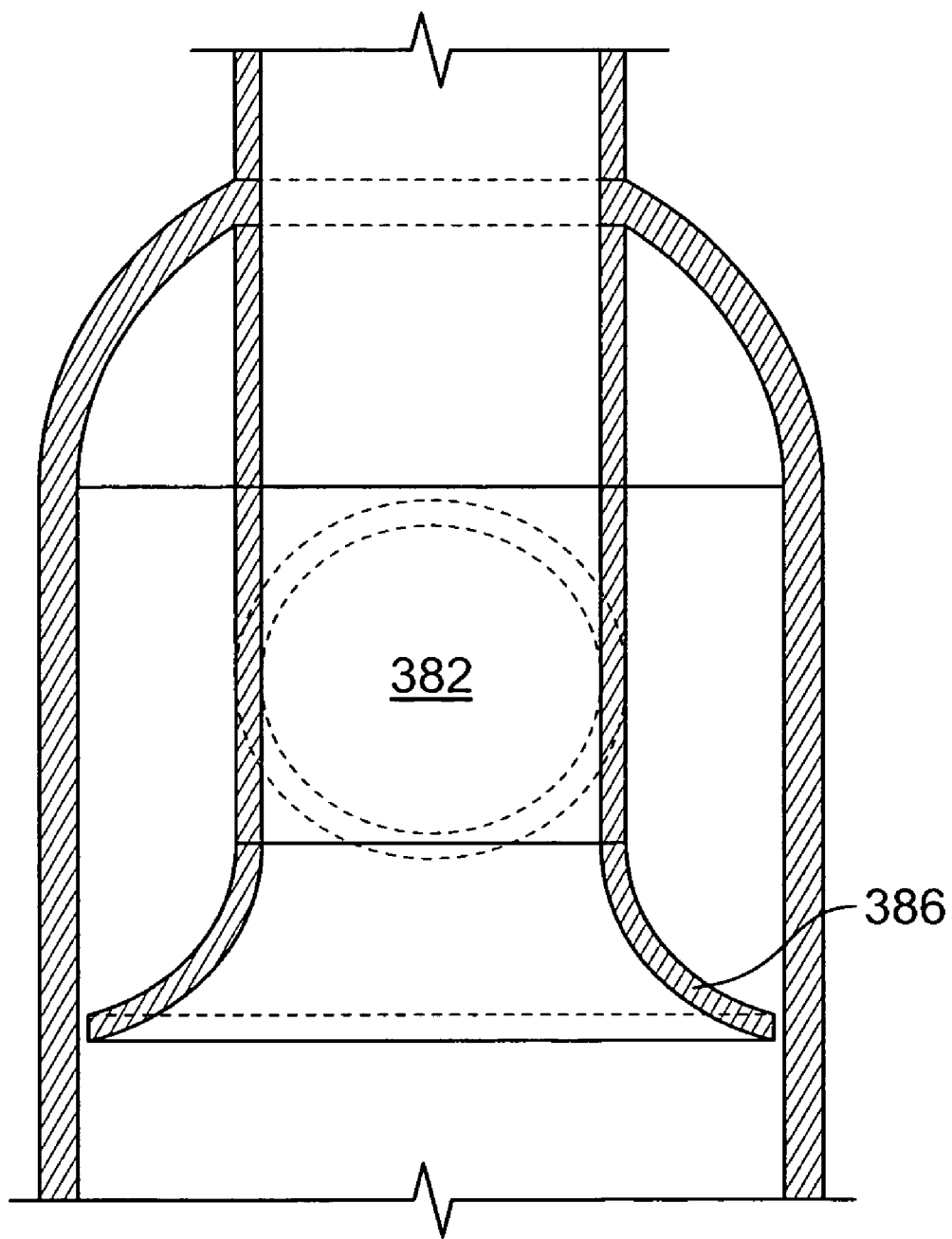
FIG. 13 shows an enlarged cross-section of heat exchange means of FIG. 12.

Turning now to FIG. 11, another embodiment illustrates a vertical cross-section of a distillation column 35 wherein the heat exchange means 311 are located in the central (enriching) section 3100 and are in open connection with the annular (stripping) section 3200. As can be seen, liquid enters the tubular means from a tray and flows down, preferably as a film, inside the tube. Part of the liquid evaporates inside the means and rises. The vapour flows from the top of the heat exchange means 11 into the annular section 3200, whereby said means may have a liquid-gas disengagement means to provide a proper gas-liquid separation. The remaining liquid that is not evaporated flows back into the stripping section 3200 from the bottom of the heat exchange means 11.

FIGS. 12A-12E and 13 show various fragmentary and cross-sectional views an illustrative heat exchange means 311 for the embodiment described in relation to FIG. 11. In the Figures, reference numerals 380, 382 and 384 indicate the various connections of the heat exchange means 311 with the annular section 3200. Connector 380 is the pathway through which the unvaporised liquid flows back into the annular section 3200, connector 382 is the liquid entry and connector 384 is the vapour removal pathway. Element 386 is a possible form of vapour-liquid disengagement means.

EXAMPLE

A column in accordance with the construction of FIGS. 1-5, having heat transfer panels 24 and downcomers 22 along with the constructional details outlined below in Table 1. Such a construction may be used for distillation of propane and propylene. The overall heat transfer coefficient is approximately 700 W/m²K and the heat transfer area per tray is around 10.5 m².

TABLE 1

| | |
|---|---|
| Diameter outer column | 2.5 m |
| Diameter inner column | 1.2 m |
| Tray spacing | 0.5 m |
| Length heat exchange panels | 0.55 m |
| Height panels | 0.4 m |
| Heat transfer area per panel | 0.44 m² |
| Number of panels per tray | 24 |
| Number of panels per downcomer | 6 |

Alternatively, for a similar column as that described above, except employing tubes as a heat exchange device, the corresponding dimensions may be as follows.

TABLE 2

| | |
|---|---|
| Length tubes (hairpins) | 0.5 m |
| Diameter tubes (external) | 20 mm |
| Pitch (rectangular) | 30 mm |
| Tubes per downcomer | 84 |

The invention claimed is:

1. A heat integrated distillation column comprising:
    an outer shell with an upper and a lower end;
    a first inner volume within the outer shell;
    a second inner volume within the outer shell, the first and the second inner volumes being separated by a dividing wall and being in heat exchanging contact with one another through the dividing wall;
    a heat exchanger fluidly connected to one of either the first or the second inner volumes to further exchange heat between the first and second inner volumes
    a plurality of trays with downcomers positioned within either one of the first inner volume, the second inner volume, or both the first and second inner volume; and
    wherein the heat exchanger is positioned at the downcomer of one of the plurality of trays.

2. The heat integrated distillation column of claim 1 wherein the first inner volume is an enriching section and the second inner volume is a stripping section.

3. The heat integrated distillation column of claim 2 further comprising a plurality of packing within the first inner volume, the second inner volume, or both the first and second inner volume.

4. The heat integrated distillation column of claim 3 wherein the packing comprises at least one of structured packing or random packing.

5. The heat integrated distillation column of claim 2 wherein the enriching section is provided with a plurality of trays and downcomers and the stripping section is provided with at least one of structured packing or random packing.

6. The heat integrated distillation column of claim 2 wherein the stripping section is provided with a plurality of trays and downcomers and the enriching section is provided with at least one of structured packing or random packing.

7. The heat integrated distillation column of claim 2 wherein the dividing wall is a generally straight wall intersecting portions of the outer shell such that the outer shell is portioned into the first and second inner volumes.

8. The heat integrated distillation column of claim 2 wherein the first and second inner volumes have cross-sectional areas that are inversely related such that as the cross-sectional area of the enriching section generally decreases from the lower end to the upper end of the outer shell, the cross-sectional area of the stripping section generally increases from the lower end to the upper end of the outer shell.

9. The heat integrated distillation column of claim 8 wherein the simultaneous general increase and general decrease of the cross-sectional areas occurs in a step-wise configuration.

10. The heat integrated distillation column of claim 1 wherein the outer shell is cylindrical and the heat integrated distillation column further comprises an inner tube positioned within and concentric with the outer shell, such that the dividing wall is created by the inner tube thereby defining one of the first and second inner volumes within the inner tube and the other of the first and second inner volumes in the annular space between the inner tube and outer shell.

11. The heat integrated distillation column of claim 1 wherein the heat exchanger comprises a plurality of heat exchangers along the dividing wall between an upper and lower end of the distillation column.

12. The heat integrated distillation column of claim 1 wherein the heat exchanger is fluidly connected to the volume configured to operate at a higher temperature.

13. The heat integrated distillation column of claim 1 wherein the heat exchanger is fluidly connected to the volume configured to operate at a lower temperature.

14. The heat integrated distillation column of claim 1 wherein the heat exchanger comprises at least one of a panel or tubular construction.

15. The heat integrated distillation column of claim 1 wherein the heat exchanger is selected from a group consisting of:
    a smooth plate;
    a textured plate;
    a smooth tube;
    a textured tube;
    a coil;
    a flat plate;
    a dimple plate;
    a dimpled tube;
    a finned plate;
    a finned tube;
    a vertically oriented corrugated sheet; and
    a corrugated plate.

16. The heat integrated distillation column of claim 1 further comprising vapor-liquid disengagement structure at the heat exchanger.

17. The heat integrated distillation column of claim 16 wherein the vapor-liquid disengagement structure is selected from a group consisting of:
    fins;
    vanes;
    corrugated structure packing sheet; and
    dumped packaging rings.

18. A heat integrated distillation column comprising:
    an outer shell with an upper and a lower end;
    a first inner volume within the outer shell;
    a second inner volume within the outer shell, the first and the second inner volumes being separated by a dividing wall and being in heat exchanging contact with one another through the dividing wall;
    a heat exchanger fluidly connected to one of either the first or the second inner volumes to further exchange heat between the first and the second inner volumes;
    a plurality of trays with downcomers positioned within either one of the first inner volume, the second inner volume, or both the first and second inner volume; and
    wherein the heat exchanger is positioned between the plurality of trays.

19. A method for distillation, the method comprising:
    providing a heat integration distillation column having an outer shell with a first and a second volume in heat exchanging contact with one another through a dividing wall;
    providing at least one heat exchanger to further exchange heat between the first and second volumes wherein the heat exchanger is fluidly connected with one of the first or the second volumes;
    providing a plurality of trays with downcomers positioned within the first inner volume, the second inner volume, or both the first inner and the second inner volume wherein the heat exchanger is positioned either at the downcomer of one of the plurality of trays or between the plurality of trays; and moving contents through the heat exchanger to facilitate further heat transfer from a fluidly connected first or second volume to the other volume without transferring mass between the first volume and the second volume.

* * * * *